United States Patent [19]

Bawden et al.

[11] 4,000,557
[45] Jan. 4, 1977

[54] METHOD AND APPARATUS FOR SECURING SWAGE SLEEVES UPON A WIRE ROPE SPLICE

[75] Inventors: Orval C. Bawden, Orem; Leonard F. Harris, Provo, both of Utah

[73] Assignee: United States Steel Corporation, Pittsburgh, Pa.

[22] Filed: Nov. 10, 1975

[21] Appl. No.: 630,385

[52] U.S. Cl. .............................. 29/525; 24/115 A; 29/235; 29/252; 29/518; 403/212
[51] Int. Cl.² .................................... B23P 19/02
[58] Field of Search ........... 29/525, 518, 252, 235; 24/115 A; 403/212

[56] References Cited
UNITED STATES PATENTS

| 2,869,906 | 1/1959 | Person | 24/115 A X |
| 3,019,520 | 2/1962 | Wooley | 29/252 X |
| 3,032,846 | 5/1962 | Stanton et al. | 403/212 |
| 3,466,738 | 9/1969 | Mount | 29/525 |
| 3,651,561 | 3/1972 | Cousin | 29/525 X |

FOREIGN PATENTS OR APPLICATIONS

| 874,492 | 8/1961 | United Kingdom | 29/518 |

*Primary Examiner*—Charlie T. Moon
*Attorney, Agent, or Firm*—William A. Danchuk

[57] ABSTRACT

Method and apparatus for securing swage sleeves upon a wire rope having a sling spliced thereon. The apparatus includes semi-automatic mechanisms for insuring the full and efficient fastening of the swage sleeve upon the splice in preparation for swaging, thereby effecting a stronger wire rope sling.

9 Claims, 4 Drawing Figures

METHOD AND APPARATUS FOR SECURING SWAGE SLEEVES UPON A WIRE ROPE SPLICE

BACKGROUND OF THE INVENTION

Wire rope, simply stated, consists of a number of wires twisted together to form a strand, a number of these strands then being twisted together helically and symmetrically to form a rope made of wire. This "stranding" of many small wires together forms a rope of a given aggregate sectional area, which when compared to a single bar of steel having the same sectional area, is of much greater strength and flexibility.

While wire rope is recognized as an immensely applicable haulage device, it is only as strong as its weakest link. This link, in quite a number of cases, is the spliced area on the wire rope. When such wire rope slings fail, they do so at the splice, unless the rope has been kinked or cut elsewhere. The industry has used swage sleeves for protecting this weakened area as well as fortifying it to the extent possible.

Under present practice, considerable time is spent forming and fixing eyes or splices on the end of wire ropes. Among the various alternative methods of formation are the "farmer's eye method", the "flemish eye method" and the "torpedo loop locks method". In all cases, however, the wire rope end is threaded through the small end of a swage sleeve. The end of rope is unlayed such that two groups of wires are formed. One group generally has the same number of strands as the other although this will obviously not be so with wire ropes having an odd number of strands. The two groups of strands are crossed to form a loop of the desired size and the two strands are layed back upon the loop such that they terminate at the point where the two strands originally separated. Once this is accomplished, the swage sleeve is manually pulled onto the "Y-shaped" portion of the eye or sling. The sleeve is then swaged or pressed onto the wire rope under a relatively large load derived from a 500 to 600 ton press. The swaged sleeve then holds the eye or sling from slipping when a load is applied to the sling.

The major problem in this method usually comes in the attempt to manually slide the swage sleeve over the "Y-shaped" portion of the wire rope. Each employee employs a different method to assemble the sleeve over the wire rope splice. In general, after the eye or sling has been formed, the employee must clamp the rope in a vice, hold the rope ends of the splice in position, and at the same time pull the sleeve onto the rope. The employee then unclamps the rope from the vice and goes onto the swaging operation at the large swaging press.

There are several problem areas in the present procedure. For instance, manually forcing the sleeve over the wire rope and its loose ends is time consuming and awkward. Difficulties in this area arise in getting the ends started into the swage sleeve. If the wires are not spread out properly around the rope, it can be difficult to pull the sleeve onto the rope. In this operation, it is possible to pinch a finger or get a puncture wound while holding and pulling the sleeve onto the rope. Furthermore, it is also possible that the sleeve will not always be pulled far enough onto the rope to make a proper connection. How far the rope enters the sleeve is left to the judgment of the employee unless he carefully measures the distance moved. Usually the employee does not take the time to measure the rope movement into the sleeve and accordingly, a weakened splice and swage results.

In the currently-employed method, the wire rope must be placed in a vice to clamp the same. This takes time and can be awkward if a special jaw has not been installed on the vice to protect the rope. It should be noted in this regard that rope damage cannot be tolerated under any circumstance. Excessive pinching or clamping can result in a weakened point on the rope and resulting in a rejection if the product is subject to a quality control. If quality control is not followed, the damaged wire rope may result in a greatly reduced strength limit to a point wherein the specific strength tolerances of the individual wire rope may be exceeded during its usage, and breakage and injury may result.

SUMMARY OF THE INVENTION

The present invention is addressed to an apparatus and method for automatically pulling the swage sleeve onto the wire rope splice prior to the swaging operation. The process and apparatus eliminates the need for employee to hold the wire strands in position while pulling the sleeve onto the rope. Moreover, the apparatus pulls the sleeve onto the rope the same distance each time resulting in more uniform eyes or slings.

Time and economic studies have been made by applicants concerning the above-noted method and apparatus. While substantial time and money may be saved by incorporation of the present apparatus and method, the most important advantages to be realized from the same are the obtaining of a quality connection, the elimination of the physical effort used by the employee, and the elimination of any seizing or special cutting and grinding operations which are performed upon the loose wire ends in an attempt to funnel the wire ends into the swage sleeve.

The apparatus of the present invention has a minimum number of moving parts and generally include a housing upon which is mounted a clamping device. Mounted in movable relationship with the clamping device is a swage sleeve securing or capturing assembly which in turn is selectively opened or closed for inserting or withdrawing a swage sleeve. The clamping assembly and the mechanism for securing or capturing a swage sleeve are located relative to one another on the housing such that movement of the securing and capturing assembly is in a direction parallel to the longitudinal axis of the wire rope when it is clamped in the clamping device. Additionally, a pneumatic system is provided for selectively forcing the securing and capturing assembly in a direction away from the clamping mechanism and toward the end of the wire rope upon which has been spliced an eye or sling loop.

Due to the automatic nature of the invention just described, the swage sleeve is forced upon the splice to the same degree and with the same effort each time it it used by any employee. Consequently, a standardized result is obtained thereby producing a stronger and more easily swaged sleeve-splice combination.

It is therefore a primary object and feature of the present invention to provide a semi-automatic apparatus for securing swage sleeves upon a wire rope having a splice thereon for forming a sling at one end of the wire rope.

It is a further primary object and feature of the present invention to provide an apparatus for securing swage sleeves over a splice formed on a wire rope efficiently and without the necessity for substantial manual manipulation.

It is a general object and feature of the present invention to provide an apparatus for securing swage sleeves upon a wire rope having a splice thereon for forming a sling at one end of the wire rope, the apparatus including a clamping mechanism and a swage sleeve coffin movable in a given direction away from the clamping mechanism for moving a swage sleeve contained therein over the spliced area in the wire rope, both the clamping mechanism and the movement of the swage sleeve coffin being pneumatically powered.

It is another object and feature of the present invention to provide an apparatus for securing swage sleeves upon a wire rope having a splice thereon for forming a sling at one end of the wire rope, the apparatus including a clamping mechanism and a swage sleeve coffin movable in a given direction away from the clamping mechanism for moving a swage sleeve contained therein over the spliced area in the wire rope, both the clamping mechanism and the movement of the swage sleeve coffin being hydraulically powered.

Other objects and features will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularity in the appended claims. The invention itself, however, both as to its structure and its operation together with additional objects and advantages thereof will best be understood from the following description of the preferred embodiment of the invention when read in conjunction with the accompanying drawings wherein:

DETAILED DESCRIPTION OF THE INVENTION

Figure 1:
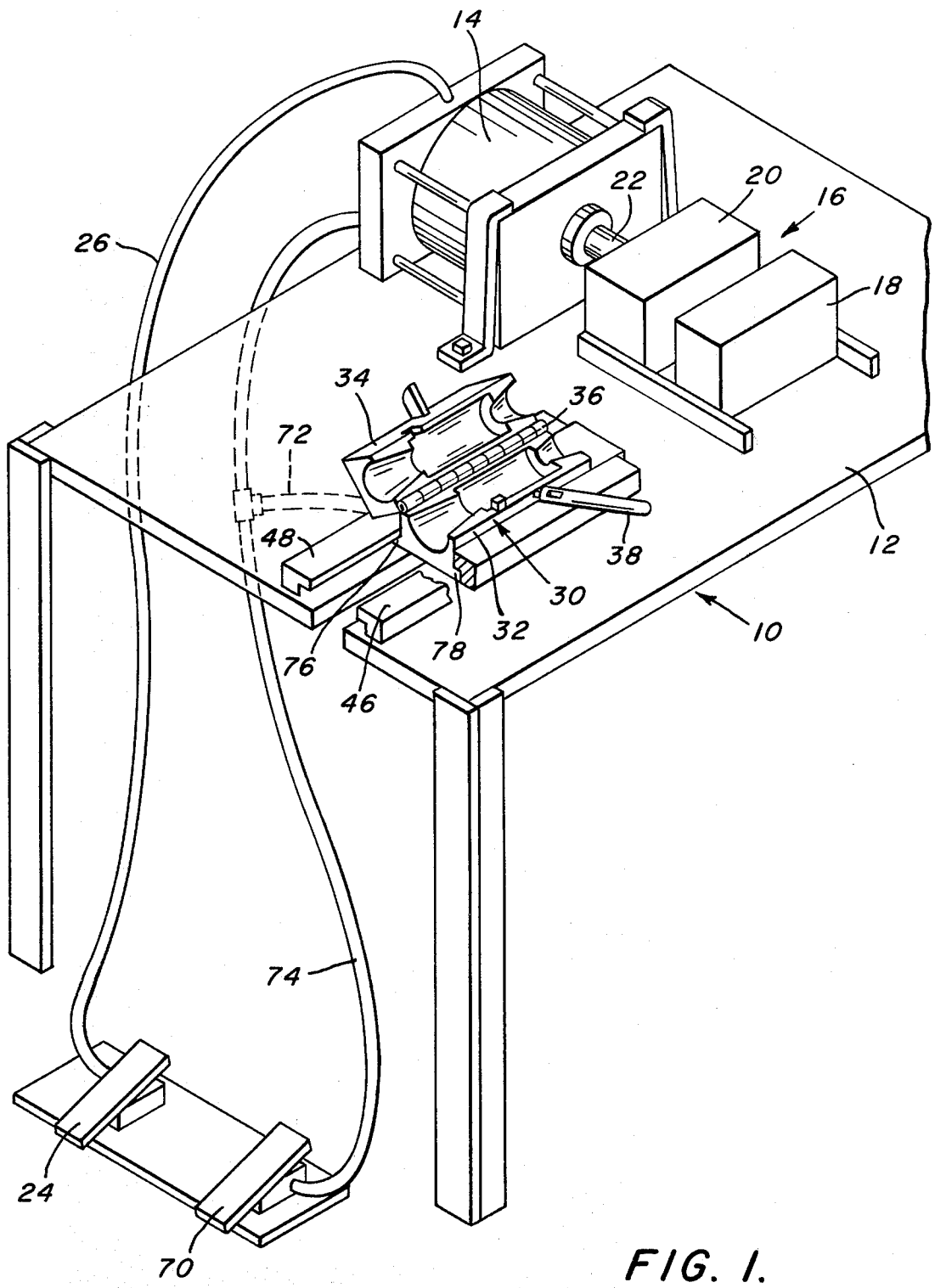
FIG. 1 is a perspective view of the swage sleeve fitting apparatus according to the present invention.

Looking to FIG. 1, there is shown a perspective view of a semi-automatic swage sleeve securing apparatus according to the present invention indicated at 10. The apparatus 10 generally includes a support table 12 providing a static basis for the components to be described. These components generally include three main parts. For the first of these parts is an air cylinder 14. The air cylinder 14 is connected to, and provides the necessary pneumatic forces for the operation of a clamping mechanism 16. The clamping mechanism 16 includes a stationary portion 18 and a movable counterpart 20 which is connected to the air cylinder 14 through an air cylinder rod 22. The movable portion 20 is actuated for movement between a first position, in which portion 20 is retracted from operable association with the stationary portion 18, and a second position, shown in FIG. 1, in which it is in wire rope clamping association with portion 18. Actuation as well as retraction of the movable portion 20 with respect to the remaining portion 18 is achieved through the use of an actuation pedal 24 interconnected through the air cylinder 14 through a hose connection 26. The specific manner in which pneumatic actuation may be accomplished is well known, and consequently, will not be shown in detail or described in this specification.

The jaws of the clamping mechanism 16, which are attached to the portions 18 and 20 may have a number of different configurations from flat plate to V-grooves. However, a preferred design incorporates jaws complementarily configured to the wire rope, a configuration which might be described as a half circle in each jaw. In this manner, the wire rope itself is not damaged or distorted when clamped, thereby doing away with the possibility of weakening the wire rope itself.

Figure 4:
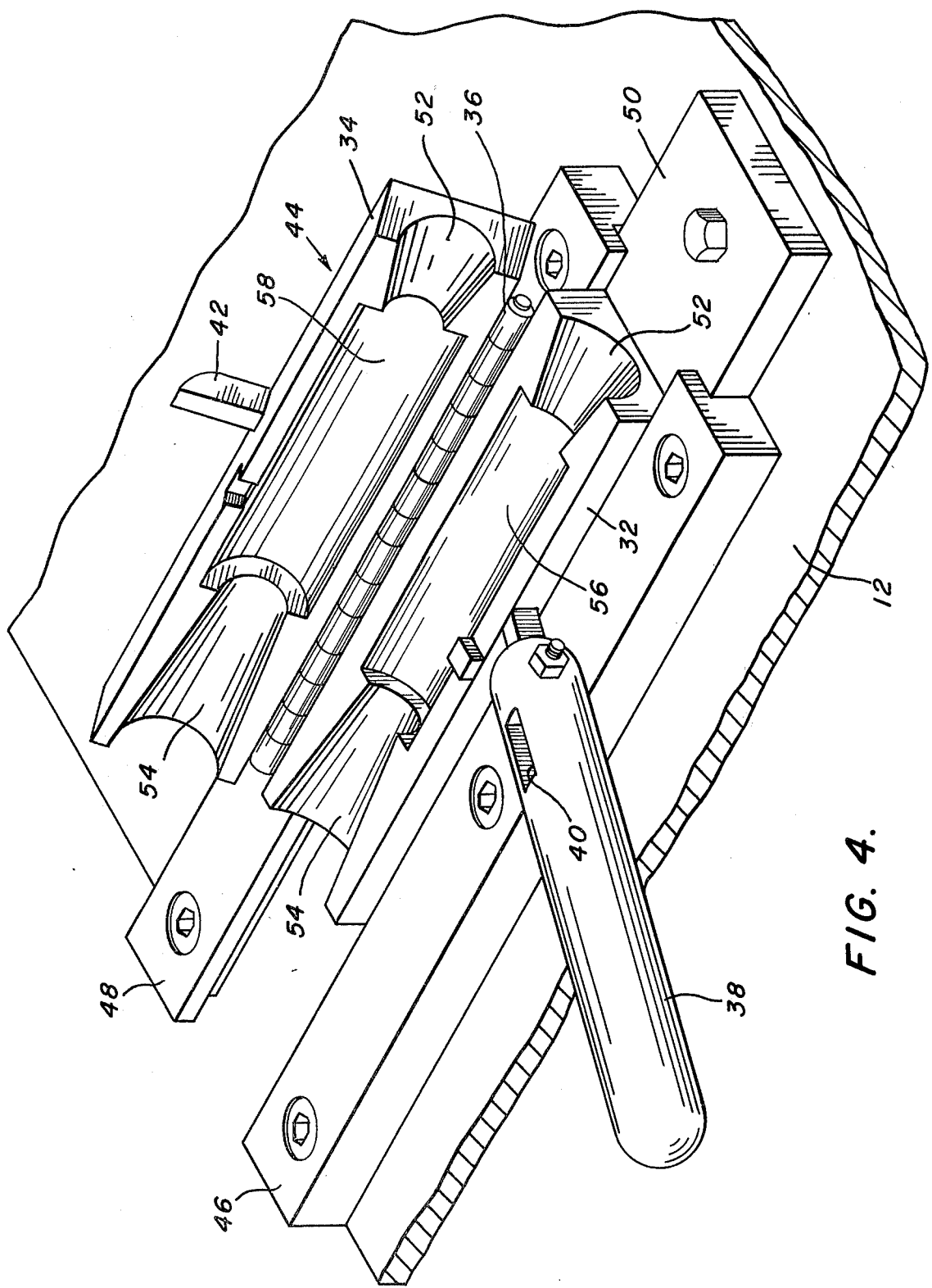
FIG. 4 is an enlarged perspective view of a portion of the apparatus shown in FIG. 1 to more clearly define detail.

Positioned co-axially with the longitudinal axis of the jaws of the clamping device 16 is an assembly 30 for capturing and releasably securing a swage sleeve 64 therein. The capturing assembly 30 is configured as a coffin for the swage sleeve and includes a bottom portion 32, an upper portion 34 and a hinge 36 connecting the two as indicated in FIG. 4. Pivotally connected along the outer edge of bottom portion 32 is a handle 38. A slot 40 is formed through the handle proximate its pivotal point of connection with portion 32. Slot 40 is configured to receive a tab 42 located on the outer edge of upper portion 34. Both the handle 38 and the tab 42 are positioned proximate the center of each of their respective edges so that they may interrelate with each other in a manner about to be described.

Looking to FIG. 4, there is shown a perspective view of the capturing assembly or swage sleeve coffin 30. The coffin 30 is movably mounted upon the table 12 within a slide assembly 44 consisting of two parallel-oriented grooved slide members 46 and 48 which include a slide cutout portion therein (not shown) and a stop plate 50 for arresting movement of the coffin 30 toward the clamping device 16 beyond a given point. The bottom portion 32 of the coffin 30 has horizontally-oriented side flanges 76 and 78 which are configured to fit within the above-mentioned slide cutout portions located in the grooved slide members 46 and 48, thereby providing for the sliding movement of the coffin 30 within the latter-mentioned members 46 and 48.

As may be evidenced from FIG. 4, the two halves 32 and 34 of the coffin 30 are substantially identically configured and have hollowed-out portions 56 and 58 located therein, respectively. The two halves, when pivoted into contact with one another have a void or opening therein which, in part, is complementarily configured with respect to the swage sleeve to be located on the wire rope sling splice. Located on either end of both halves 32 and 34 are funneled portions 52 and 54. The funneled portions 52 on portions 32 and 34, when combined in the coffin's closed state, provide for the easy entrance of one end of a wire rope into the coffin and the swage sleeve located therein. As previously explained, one problem area is getting the rope end into the small end 60 of a swage sleeve, a problem which is solved using the funneled portion 52 of the coffin 30. The other funneled portion 54 facilitates the movement of the subsequently formed splice into the larger end 62 of the swage sleeve. This relationship may best be seen by making reference to FIGS. 2 and 3.

Once the swage sleeve is placed in the bottom portion 32 of the coffin 30, the top portion 34 is rotated about the hinge 36 until the coffin is closed. During this closing movement, the tab 42 of upper portion 34 is moved into a position in which it falls through the slot 40 located in handle 38. The handle 38 must be elevated a slight amount beyond the horizontal in order for this to occur. The handle 38 is then moved to its vertical position, thereby "locking" the coffin closed with the swage sleeve 64 located therein. The operation continues when the wire rope clamping jaws 18 and 20 are opened by actuation of the clamping foot pedal 24 which retracts the cylinder rod 22 and the associated clamp jaw 20. One end of the wire rope 66 is pulled through the clamping jaws 18 and 20 and is pushed into the funneled portion 52. The rope is then pulled through the sleeve and coffin to a predetermined length which is dependent upon the size of the sling loop to be formed. The rope is then unraveled and an eye is made by dividing the rope into two parts and wrapping the rope back on itself, the latter procedure being known in the field. The "Y-shaped" portion 68 of the eye or sling is then manually pulled up next to the funneled portion 54 of the coffin 30. The rope which lies between the opened jaws 18 and 20 of the clamping device 16 is clamped by the jaws by actuation of the clamping pedal 24 which operates the air cylinder 14 and extends the air cylinder rod 22 and associated jaw 20. The swage sleeve 64 which is captured within the coffin 30 is now ready for movement onto the splice of the sling eye.

Movement of the swage sleeve 64 onto the sling splice is achieved by actuation of a second foot pedal 70 located adjacent foot pedal 24. The pedal 70 functions as a switch for providing power to the movable coffin 30 from the air cylinder 14 through appropriate pneumatic linkages schematically indicated at lines 72 and 74. Powering of the coffin 30 moves it and its captured swage sleeve 64 along the slide members 46 and 48 such that the swage sleeve is pulled onto the wire rope splice. The funneled portion 54 of the coffin 30 guides the wire rope ends into the sleeve without any other of the above-mentioned time and danger. The handle 38 is then pulled down to unlock the top portion of the capturing assembly 30. The top portion 34 is opened and the swage sleeve 64 is exposed. The foot pedal 24 is again actuated, thereby opening the jaws 18 and 20 and releasing the wire rope contained therein. The swage sleeve is then moved to a swaging area where it is swaged.

Figure 2:
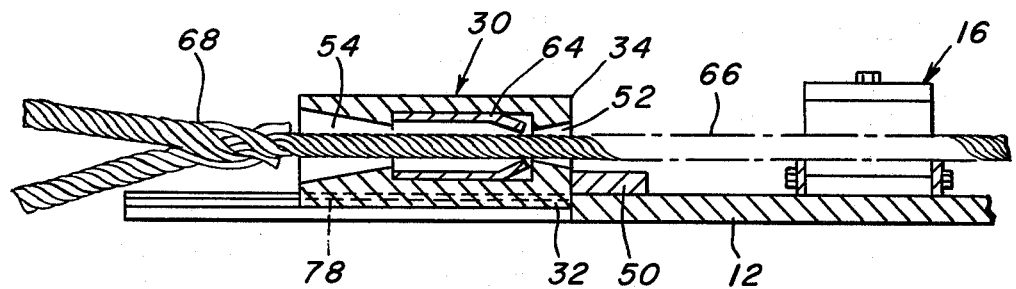
FIG. 2 is a sectional view of a portion of the apparatus shown in FIG. 1 during one stage of its operation.
Figure 3:
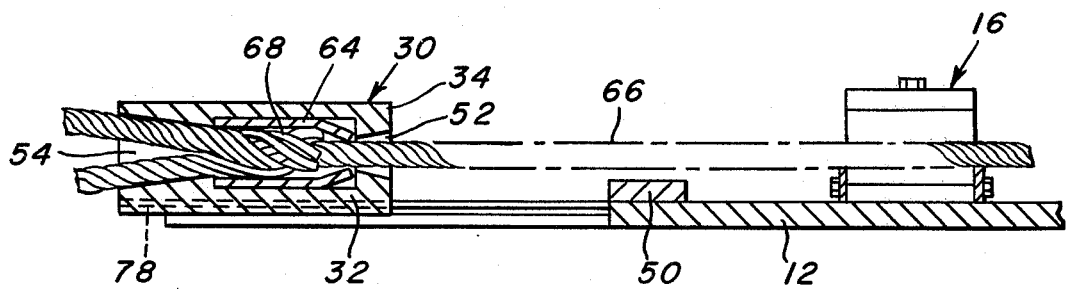
FIG. 3 is the apparatus of FIG. 2 during another stage of its operation.

The movement of the coffin 30 from its initial position shown in FIG. 2 to its final position shown in FIG. 3 may be regulated in length by adjustment of the size of the stop plate 50. This adjustment should be rarely needed, but might be employed in changing from one size wire rope to another.

The apparatus just described is employed mainly with round or circular carbon steel sleeves because of the prevailing economics. Round or circular carbon steel sleeves are approximately one-third the cost of an oval sleeve. However, since the latter are easier to manually move over the sling splice, they are used instead of the cheaper round sleeves. This problem no longer presents the economically undesirable solution priorly used. Accordingly, the less expensive swage sleeve may be used with greater efficiency and savings.

The present semi-automatic swage sleeve securing apparatus provides many advantages over current sleeve securing procedures. Among these are the reduction of cost by using round sleeves, the reduction in time for assembly by eliminating the manual insertion of the splice into the swage sleeve and the elimination of the need to measure and mark the rope to provide a standardized movement of the sleeve onto the splice. Moreover, the use of an automatically movable assembly drastically reduces the physical efforts previously necessary to pull the sleeve onto the rope. It should become apparent that the greatest advantage to be realized however, is the greatly improved quality of the product being manufactured, a result having a direct relationship to the safety of the employee producing the sling as well as the employee using it.

While certain changes may be made in the above system and assembly without departing from the scope of the invention herein involved, it is intended that all matter contained in the above description or shown in the accompanying drawings shall be interpreted as illustrative and not in a limiting sense.

We claim:

1. Apparatus for securing swage sleeves upon a wire rope having a splice thereon configured to form a sling at the end of such wire rope, said apparatus comprising:
   a supporting structure;
   means movably mounted on said supporting structure for securing and capturing a swage sleeve, said securing and capturing means being configured to permit the passage of an end of wire rope therethrough such that such end of such wire rope may be passed through such swage sleeve to be spliced and formed into a sling loop;
   means positioned on said supporting structure for clamping a portion of such wire rope on the other side of said securing and capturing means from such wire rope sling loop; and
   means for automatically forcibly moving said securing and capturing means, and such swage sleeve contained therein, in a direction away from said clamping means and toward such sling loop on such end of the wire rope for forcing the spliced portion into such swage sleeve such that a stronger splice is realized when such swage sleeve is swaged.

2. The apparatus according to claim 1 in which said securing and capturing means is movable from a first position, in which the swage sleeve contained therein is in a frictionally fitted status with the splice of such sling loop on such wire rope, to a second position in which the swage sleeve contained therein is forced onto such splice with sufficient force to wholly contain such splice thereby forming a stronger splice.

3. The apparatus according to claim 1 in which said securing and capturing means is further configured including means formed as a portion thereof which channels the spliced portion of such wire rope, along with its loose and ragged ends into said securing and capturing means and, subsequently, into such swage sleeve.

4. The apparatus according to claim 1 in which said securing and capturing means is configured generally as a coffin, having a bottom portion and a top portion hinged thereto, both said bottom and top portions having substantially equal shapes such that at least a portion of the interior of said securing and capturing means is complementary shaped relative to such swage sleeve when said top and bottom portions are joined.

5. The apparatus according to claim 1 in which said securing and capturing means is configured generally as a coffin, having a bottom portion and a top portion hinged thereto, both said bottom and top portions having substantially equal shapes such that at least a portion of the interior of said securing and capturing means is complementary shaped relative to such swage sleeve when said top and bottom portions are jointed, said securing and capturing means having stops located therein for preventing substantial movement of such swage sleeve within said securing and capturing means when the latter is in either its opened state, and said top and bottom portions are hinged away from each other, or in their closed state.

6. The apparatus according to claim 5 in which said securing and capturing means further includes releasable locking means for locking both said top and bottom portions together with a swage sleeve therein prior to actuation of said moving means.

7. The apparatus according to claim 1 in which said means for automatically forcibly moving said securing and capturing means is pneumatically actuated.

8. The apparatus according to claim 1 in which said clamping means is pneumatically actuated.

9. A method of automatically securing swage sleeves on wire rope sling splices, said method comprising:
fitting a swage sleeve within a holder complementarily configured relative to the swage sleeve;
threading the end of a wire rope, intended to be spliced into a sling, into the holder and through the swage sleeve contained therein;
forming the wire rope end into a spliced sling;
clamping the wire rope at a point on the opposite side of the holder from the spliced sling;
automatically moving the holder, and the swage sleeve contained therein, in a direction away from the point at which the wire rope is clamped and toward the splice formed on the sling, thereby forcing the swage sleeve onto the splice of the wire rope; and
releasing the swage sleeve from the holder and unclamping the wire rope in preparation for a swaging operation.

* * * * *